(12) United States Patent
Ledbetter et al.

(10) Patent No.: US 9,021,686 B1
(45) Date of Patent: May 5, 2015

(54) PORTABLE RACKING TOOL FOR ELECTRIC EQUIPMENT REPLACEMENT

(76) Inventors: Finley Lee Ledbetter, Argyle, TX (US); Ashley Sue Ledbetter, Argyle, TX (US)

( * ) Notice: Subject to any disclaimer, the term of this patent is extended or adjusted under 35 U.S.C. 154(b) by 0 days.

(21) Appl. No.: 13/608,918

(22) Filed: Sep. 10, 2012

Related U.S. Application Data

(63) Continuation of application No. 12/563,027, filed on Sep. 18, 2009, now Pat. No. 8,261,433.

(51) Int. Cl.
*H02B 3/00* (2006.01)
*H02B 11/127* (2006.01)

(52) U.S. Cl.
CPC ............... *H02B 3/00* (2013.01); *H02B 11/127* (2013.01)

(58) Field of Classification Search
CPC ................................ H02B 11/127; H02B 3/00
USPC ..................... 200/50.21, 50.24; 29/270, 764
See application file for complete search history.

(56) References Cited

U.S. PATENT DOCUMENTS

| | | | |
|---|---|---|---|
| 5,165,827 A * | 11/1992 | Miller | 408/16 |
| 5,397,869 A | 3/1995 | Huen | |
| 5,453,587 A | 9/1995 | Hurley et al. | |
| 5,465,031 A | 11/1995 | Nilssen | |
| 5,477,017 A | 12/1995 | Swindler et al. | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 2005/0194243 A1 | 9/2005 | Prineppi | |
| 2010/0065532 A1* | 3/2010 | Champney | 219/74 |
| 2011/0062002 A1* | 3/2011 | Hawkins et al. | 200/50.24 |

\* cited by examiner

*Primary Examiner* — Livius R Cazan
(74) *Attorney, Agent, or Firm* — Gardere Wynne Sewell LLP

(57) ABSTRACT

An electrical device removal tool, such as for circuit breakers, that is lightweight, portable, and rugged for providing electrically operated controlled insertion and removal of electrical equipment by an operator from a remote location using a coupling device for engagement with the electrical equipment housing.

10 Claims, 11 Drawing Sheets

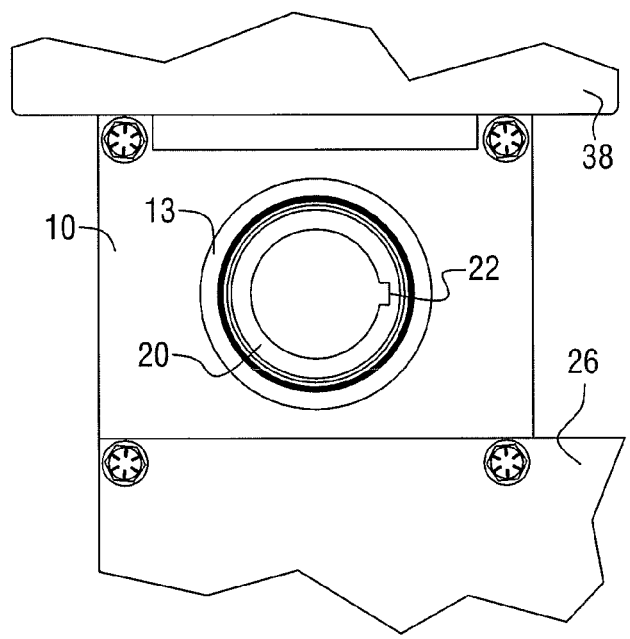
FIGURE 5A
FIGURE 5B
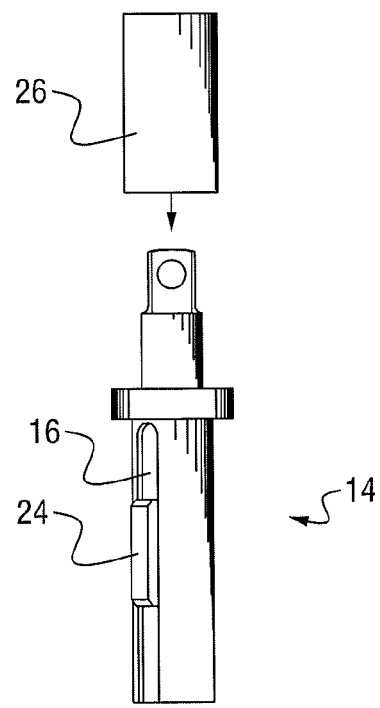

PORTABLE RACKING TOOL FOR ELECTRIC EQUIPMENT REPLACEMENT

CROSS-REFERENCE TO RELATED APPLICATIONS

This application is a continuation of U.S. application Ser. No. 12/563,027, filed Sep. 18, 2009, now U.S. Pat. No. 8,261,433 which is incorporated herein by reference in its entirety.

TECHNICAL FIELD

The present embodiments generally relate to a portable, easy to move tool usable for electric equipment which can charge, close or trip individual electrical units in a facility, such as a hospital or a power plant.

BACKGROUND OF THE DISCLOSURE

A need exists for a lightweight, portable tool that prevents harm to humans in a facility which has electrical equipment that needs replacing and is susceptible to arcing during testing, maintenance or switching out of equipment on a piece by piece basis.

A need exists for a tool that can be lifted by one hand of a human and used for performing maintenance or switching out of equipment such as in a circuit breaker room on a piece by piece basis without shutting down power to the entire facility. This is particularly important for hospitals, but also has an impact on other facilities, such as hotels.

It is common for a large facility, such as a hospital or a hotel, to have to shut down all power in the facility for 1 and ½ hours to replace circuit breakers and do other manual electrical maintenance in a switching room. This means a hotel has to shut off power, typically at 3:00 am to 4:30 am at least once a year to replace used or worn equipment. A hotel often has pilots staying with them, and these customers, that need to be up at 4:00 am, will then not stay at the hotel that night, causing a loss of revenue.

More importantly, a hospital that needs to perform the same shut down, due to arcing that occurs when the system is fully powered, has many more difficulties and must provide back up power to its emergency room, and to its life support facilities and the intensive care units, where patients are on breathing machines. The time and scheduling, and costs involved are immense, and if something goes wrong, it can mean loss of a patient's life.

If no shut down is performed, the switching room can generate "arcs" of electricity that provide first and second degree burns to a human manually swapping out the equipment.

A need has long existed for a tool that can be operated by a person without needing to shut down a facility to swap out circuit breakers or similar "electric arc" producing equipment.

The present embodiments meet these needs.

DESCRIPTION OF THE FIGURES

The detailed description will be better understood in conjunction with the accompanying drawings as follows:

FIG. 5A is a detail of a keyway for receiving the rotatable shaft.
FIG. 5B is a detailed of the rotatable shaft.

DETAILED DESCRIPTION

Figure 1:
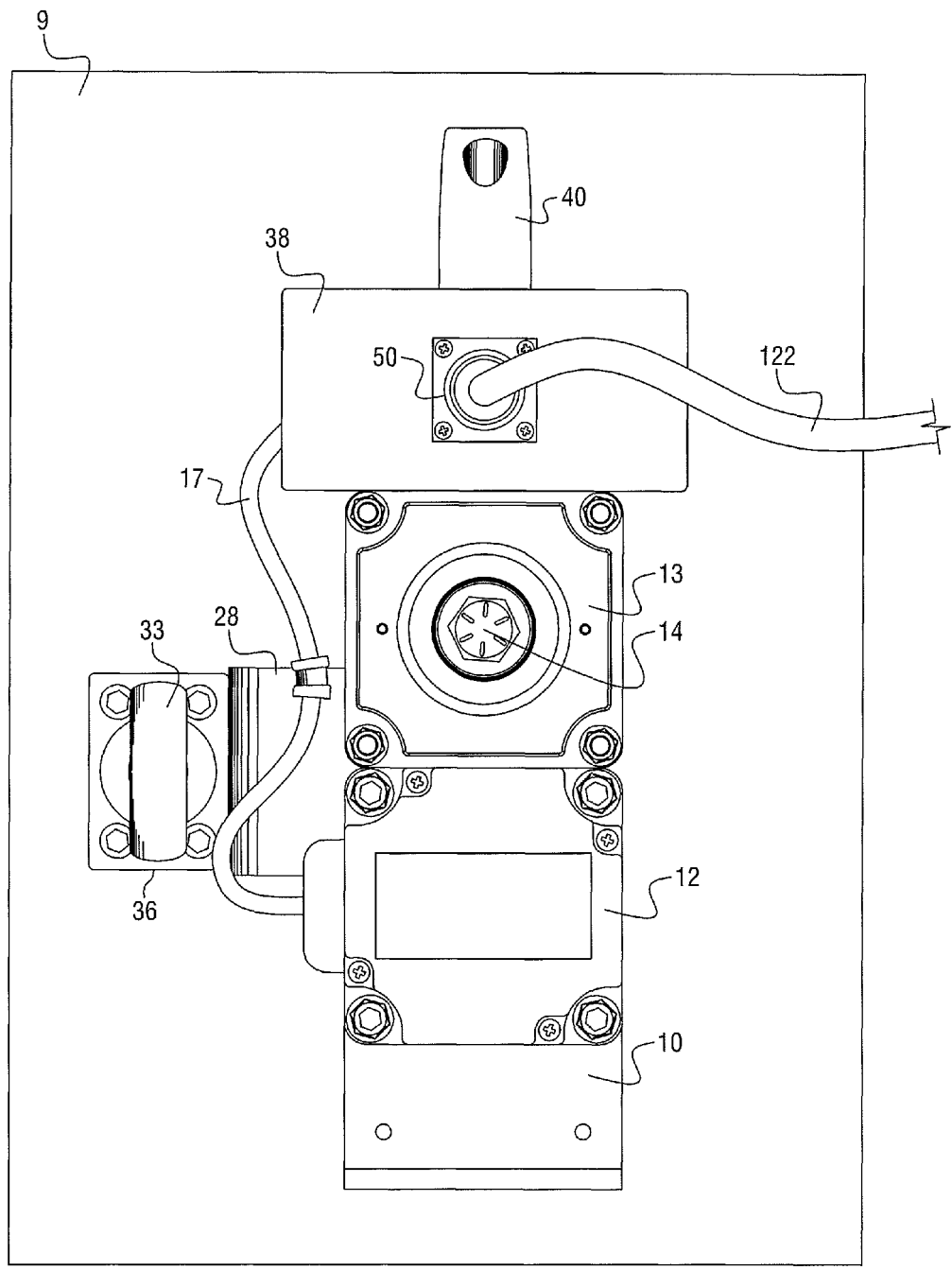
FIG. 1 is a back view of the portable racking tool.

Before explaining the present system in detail, it is to be understood, that the system is not limited to the particular embodiments and that it can be practiced or carried out in various ways.

The present embodiments relate to a portable racking tool for removing equipment in a facility, such as removing circuit breakers in a switch room of a hospital.

The tool enables an operator to no longer need to wear the typical inch thick full body arc flash hazard suit when operating the tool.

The tool allows an owner to more easily maintain equipment in an electric room, clean it up, lube it, without needing to shut down the entire facility during such maintenance.

The embodiments can be operated by a user without detailed training. An unskilled, non-English speaking worker can use this tool in less than one hour from seeing the tool for the first time.

This tool is lightweight, less than 40 pounds, such as 20 pounds, and even as light as 15 pounds in an embodiment, enabling men and women, strong and frail, to move the device, install and remotely operate it.

The equipment prevents an arc explosion from harming people during live switching, live switch testing, or live maintaining of electric equipment.

This device allows one circuit breaker to be shut down and replaced while an entire bus of circuit breakers remains live and operational.

This tool is particularly good for small tight places, as the dimensions are less than about 12 inches long by about 12 inches wide by about 12 inches deep.

The tool is extraordinarily effective in saving time and money during maintenance, as no power shut down is needed, as well as saving humans from harm, but enabling operation from a safe distance away from the circuit breakers or similar electrical equipment devices.

The invention is a portable racking tool for removing or installing electrical equipment having a metal surface surrounding the electrical equipment.

The portable racking tool can have a motor mount plate such as a ¼ inch thick lightweight metal, such as aluminum plate. The motor mount plate can be formed from other substances such as steel, stainless steel, alloys of steel, graphite composite, other rigid, durable, non-deformable polymers, such as high density polyethylene, high density polypropylene with reinforcing bars, or other polymers that not deform at temperature of at least 250 degrees Fahrenheit.

The motor mount plate can have a body plate with a width between about 2 and 6 inches. The motor mount plate can have three components, the body plate, a lower support extending from the body plate at about 90 degrees and an upper support extending from the body late at about 90 degrees.

The lower support can have a length between about 2 and 8 inches from the body plate, such as 4.5 inches. The upper support can extend from the body plate at a length slightly less, such as 1 inch less than the length of the lower support. The upper support can have a width that is slightly less than or equal to the lower support.

In an embodiment, the support does not contact the metal surface around the electrical equipment to be maintained or installed or removed while still supporting the motor control housing.

Attached to the motor mount plate can be a motor with gear box. The motor can be a variable speed motor.

A rotatable shaft with an axis and a shaft keyway can extend through the motor mount plate for receiving torque from the gear box. The gear box can have a shaft housing. The gear box can rotate the rotatable shaft in a clockwise direction and in a counterclockwise in the reverse direction and may be able to have a neutral position.

The gearbox can have a gear box keyway disposed in the shaft housing.

A key can engage between the gear box and the gear box keyway and the shaft keyway.

A coupling can connect to the torque limiting clutch on one end and on the other end, the coupling can engage the electrical equipment needing installation, maintenance or removal. The coupling can be a socket, for example.

A magnet mount bracket can extend from a first side of the motor mount plate. The magnet mount bracket can connect to the motor mount plate at about a 90 degree angle.

A surface-engageable removable non-electric magnet can be attached to the magnet mount bracket for preventing the portable racking tool from sliding off the metal surface surrounding the electrical equipment. The non-electric magnet can provide a secure engagement between the motor mount plate and the metal surface near the electrical equipment to be operated on.

A motor control housing, which can be a four sided housing with bottom and closeable top is secured to the motor mount plate. The motor control housing can include a motor control circuit board in communication with the motor, an interface plug for supplying power to connectors engaging at least one relay connected to the motor control circuit board from a power supply, which can be a remote switch operator.

The motor control housing can hold a motor control circuit board in communication with the motor for enabling the motor to operate at a slow speed, or another designated speed.

An interface plug can secure into the motor control housing. The interface plug can allow a plug to supply power and control signals to the motor and motor control circuit board from a power supply apparatus like a remote switch operator as described herein.

One or two right angle supports made of plate steel can be used to reinforce the motor mount plate.

A lower support can be used to support the weight of the motor on the motor mount plate and an upper support can be used to support the weight of the motor on the motor mount plate opposite the lower support.

This lightweight portable tool can be usable for installing or removing circuit breakers or other electrical equipment in a utility room or switching room that have a plurality of low voltage circuit breakers, a medium voltage circuit breakers, a switch gears, motor control centers, or contactors.

In an embodiment, the lower supports and upper supports can extend from the motor mount plate at about a 90 degree angle to provide spacing for the coupling, can be switched out for different sizes that performs the installation, removal or testing of the electrical equipment.

The coupling can engage the rotatable shaft that can be between about 2 inches to about 8 inches in length. The shaft can be made from steel and have a diameter that fits the gear box.

The motor mount plate, which can be a one piece structure having a motor mount body, lower support and upper support can be formed from ¼ plate metal. Various metals can be used, including but not limited to steel, aluminum, and other metals. This steel, in an embodiment, can be coated with a material that prevents the build up of an ionic charge.

At least one magnet can be used to hold the motor mount plate to the surface of metal surrounding the electrical equipment. The magnet is an engageable/disengageable non-electric magnet. It is important that the attaching mechanism is non-electric to prevent arcing.

A magnet attaching means in an embodiment should allow fast disconnect from the electric equipment in case of fire, or arcing or some other electrical shorting.

The magnet connects to the metal surface, in an embodiment, by rotatably extending the magnet from a magnet housing by turning a handle or using a similar structure.

In an embodiment, the magnet housing can be a different metal from the magnet, but provide an impact resistant protection to the magnet. The housing surrounds the surface engageable non-electric magnet allowing the magnet to couple to the metal surrounding surface smoothly. The magnet should have a smooth face for a secure engagement in an embodiment.

In an embodiment, the magnet mount bracket can extend at a right angle from the motor mount plate and the magnet can be mounted parallel to the bracket.

The lower support or upper support and the motor mount plate can be a one piece structure, wherein the components are all welded together. Reinforced polymers may be usable herein for the plates.

It is possible the supports can be made from a tough, durable heat resistant polymer or composite, such as a high density polypropylene or a graphite composite.

A handle can be mounted to the motor control housing enabling an operator to pull the device off the electrical equipment easily and move the housing around easily. The handle can be made of a material that insulates the user from shocking, such as plastic, reinforced composite, or rubber coated metal.

In an embodiment, the motor control circuit board is wirelessly connected to the motor. This enables a wireless communication between the two that can also be controlled from a remote wireless device, such as a cell phone or an easy to use push button device such as a wireless device using radio frequencies, infrared frequencies or ultra high frequencies. The remote wireless device may be connectable to the motor control circuit board through a network, such as an Internet connection, a local area network, a wide area network or another global communication network.

The embodiments can also include a system for racking electrical equipment that includes the aforementioned portable racking tool with a power supply apparatus such as a remote switch operator.

To connect to the power supply apparatus a power cord can be used to connect to an interface plug in the motor housing.

A first embodiment of the power supply apparatus can be a remote switch operator that includes a housing such as an explosion proof housing that can be watertight, such as one made from impact resistant thermoplastic.

The housing can have a body and a closable lid. The lid can be hinged to the body and be in a locking relationship to the body. The body and the lid can each have a plurality of reinforcing ribs.

Inside the body can be a face plate separating a top of the body from an interior portion of the body.

The face plate can be made from coated steel having a thickness of about ¼ inch. In the face plate a power plug can be positioned to provide current to components in the body, such as a battery charger.

A charger power supply can be located in the housing beneath the face plate for receiving AC current from an AC outside source.

An AC plug in the face plate can receive the AC current from the AC outside source.

One or two batteries can be positioned in the housing beneath the face plate in the housing.

A relay can connect to the battery.

If two batteries are used, then two relays can be used.

A circuit board can connect to the relay and the battery for controlling operation of the motor.

An install momentary push button can engage the circuit board allowing operation of the motor and control of the portable racking tool.

A remove momentary push button can engage the circuit board allowing removal of the portable racking tool from the electrical equipment.

An on/off switch that can be a toggle switch or a turning switch can connect or disconnect the battery.

A circuit breaker can connect between the battery and circuit board.

The portable racking tool in an embodiment can include a radio transmitter/receiver connected to the circuit board.

A wireless radio controller can communicate with the radio transmitter/receiver for remotely initiating power to the portable racking tool while a user of the wireless controller is a safe distance from the portable racking tool, such as 12 feet or more. The operator can even be in a different room.

The wireless radio controller can be a handheld controller with push buttons that are for direct communication with the buttons on the face plate, for causing identical actuations, but from a safe distance from the remote switch operator.

The wireless radio controller in an embodiment can have the usual electronics for communicating and forming a signal, and electronics for transmitting a signal to an antenna and from the antenna to the portable racking tool.

In a particular embodiment, the wireless radio controller has a remote on-button, a remote off-button, a remote install momentary push button and a remote remove momentary push button.

A second embodiment of a remote switch operator for providing control and power to the portable racking tool is one what includes a housing with a body and a lid pivotably connected to the body. A first face is adjacent a second face plate within the housing. Each face plate has a metal side so that the side and face plate form an L shaped metal structure.

In this embodiment of the remote switch operator usable as the controllers and power supply of the portable racking tool is a plug. The plug is in the first face plate. This plug provides current and signals from the housing to the portable racking tool.

A retractile cord for carrying current and signals from the plug to the portable racking tool can be used.

At least two relays can be located in the housing beneath the first face plate. The two relays can be connected to the retractile cord.

At least two batteries can be located in the housing beneath the first face plate. The batteries can be connected in series with each other and the batteries can be connected to the two relays.

A DC plug can also be installed in the first face plate for accepting a DC voltage (up to 27 volts) for charging the at least two batteries from a power source.

A power off/on switch can be in the first face plate and operates to disconnect the at least two batteries when in an off position and connect the at least two batteries to the relays when in an on position.

A remove momentary push button can be used in the first face plate in this embodiment, for transmitting an actuating signal from at least one of the batteries to a current controller located in the second face plate.

An install momentary push button can be placed in the first face plate for transmitting an actuating signal from at least one battery to the current controller. The current controller can be a custom built controller with a processor, data storage, and computer instructions in memory for comparing current to preset current limits and for increasing or decreasing current based on commands input to a panel of the current controller. A usable current controller can be one made by RK electronics.

A circuit breaker can be installed in the first face plate for connecting between positive poles of the at least two batteries and the power off/on switch.

It should be noted that the current controller attached to the second face plate can also be connected to the relays and the remove momentary push button, as well as the install momentary push button and the batteries that energize the current controller.

The second embodiment of the remote switch operator usable with the portable racking tool can have a radio controller positioned under the second face plate and connected to the batteries. In this second embodiment, the radio controller can be a radio transmitter/receiver that communicates to a handheld unit, similar to the one already described.

In an embodiment, the current controller may include an automatic shut off switch for disabling the portable racking tool when the portable racking tool exceeds a preset amperage.

In an embodiment, the current controller can be a circuit board disposed on an aluminum plate with a membrane overlay and at least a two digit display microprocessor with flash memory for comparing sensed data to a predetermined threshold. The current controller can be as model RRS-1 available from RK Electronics of Cincinnati.

The current controller can have a connector for engaging the interface plug and a connector for engaging the power supply.

It should be noted that for either embodiment of the remote switch operators supplying power to the portable racking tool, that the batteries can provide between about 12 to about 27 volts of DC current. An inverter can be used in either embodiment's housing for communicating between the AC current and the DC battery, and in an embodiment a battery charger can be placed in the housing to receive AC current and charge the batteries.

The embodiments can include a method for racking electrical equipment that involves setting a torque limiting clutch for a motor to a predetermined torque setting.

As a next step, the method can include setting a current controller to a predetermined amp setting.

Subsequently in the method, a coupling can be aligned with electrical equipment to be installed, removed or maintained. The coupling connects to a shaft that engages with a key and keyway combination to a torque-limiting clutch, motor and current controller.

The racking mechanism can be installed so that portions of the portable racking tool surround the electrical equipment to be maintained and one component engages a metal surface around the electrical equipment.

The method also includes the steps of securing the portable racking tool to the metal surface around the electrical equipment using a surface-engageable removable non-electric magnet.

Next, a power supply apparatus is connected to the interface plug communicating with the motor and current controller.

Power is flowed through the interface plug to the motor, and the torque-limiting clutch and current controller operate to rotate the motor and shaft in a clockwise or counter clockwise direction causing rotation of a coupling with the motor to remove or install electrical equipment while an operator is remote to the portable racking tool.

Turning now to the figures. FIG. 1 shows a back view of the portable racking tool.

This portable racking tool can have a handle 40 attached to a motor control housing 38.

The handle can be used for carrying the portable racking tool, and also for installing or removing the portable racking tool.

The motor control housing 38 can have an interface plug 50 in the housing to which a cord 122, for receiving signals and power from a remote switch operator, which is shown in later figures, can be attached.

A portable rotating shaft 14 can extend from a gear box 13.

A gear box 13 can contain a torque limiting clutch adjacent the motor control housing 38.

A motor 12 can be located beneath the gear box 13.

A motor mount plate 10 can support the motor 12.

A magnet mount bracket 28 can be secured to the motor mount plate 10, adjacent to the gear box 13. A magnet 32, shown in FIG. 3, with a magnet housing 36 can be attached to the magnet mount bracket.

A magnet handle 33, which can be attached to the magnet 32, can be turned, extending the magnet from the housing for engagement with a circuit breaker to be removed with a metal surface 9.

A communication cable 17 can be used to connect the motor 12 and the motor control housing 38. It should be noted that the motor control housing 38 can contain a circuit board and relays for controlling the gear box, clutch and motor. The motor control housing 38 can also contain a microprocessor, data storage and computer instructions for allowing the processor to operate the motor, gear box and clutch.

Figure 2:
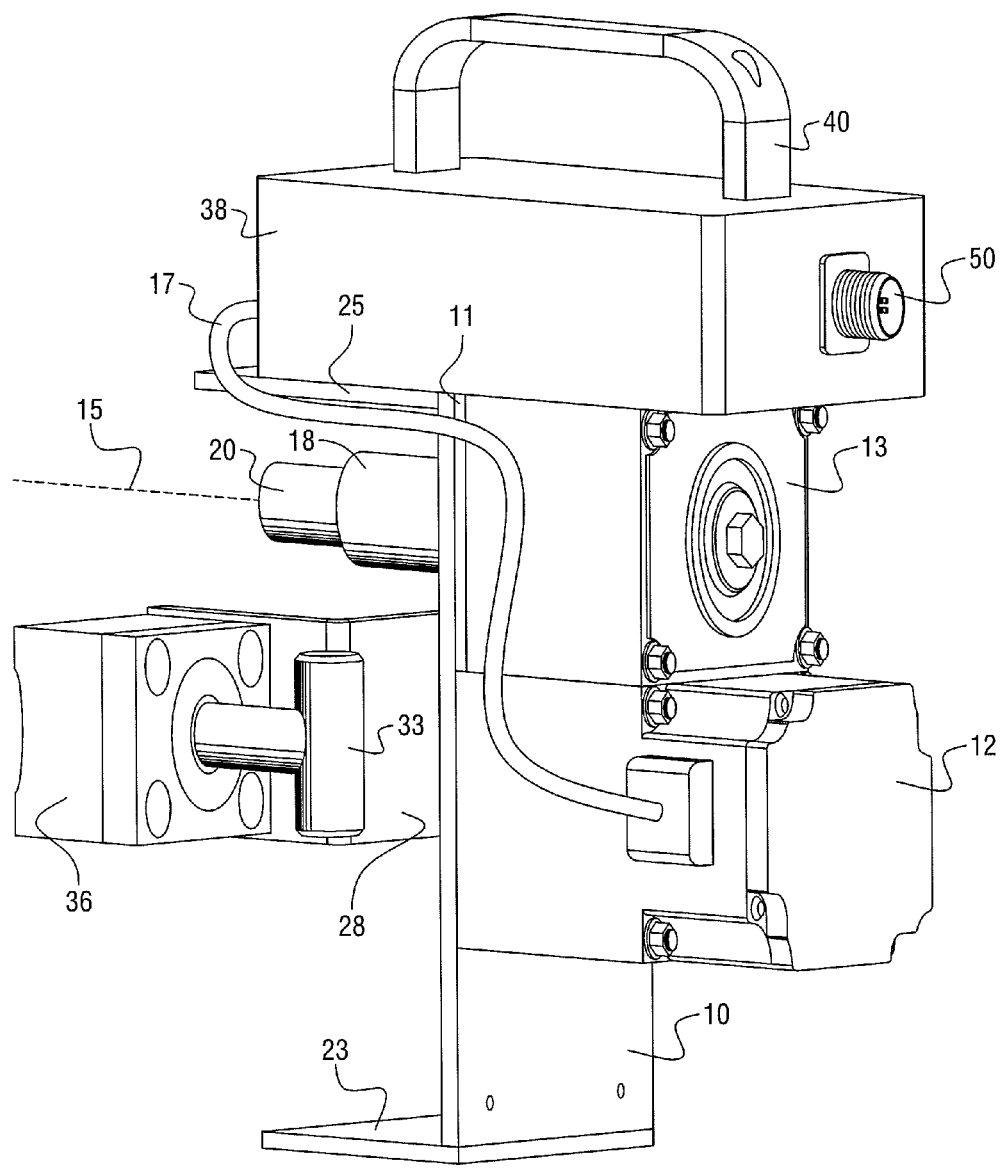
FIG. 2 is a perspective view of the portable racking tool.

FIG. 2 shows a perspective view of an embodiment of the portable racking tool.

In this FIG. 2, the handle 40 can be seen for gripping by an operator during placement or removal. The communication cable 17 is also more clearly viewed and can provide communication and power from the motor control housing 38 to the motor 12.

FIG. 2 shows the motor mount plate 10 which can be secured at right angles to the lower support 23. The lower support 23 can maintain the motor 12 at a predefined distance from the electrical equipment to be operated.

The gear box 13 is shown attached to a gear box mount plate 11. The gear box mount plate 11 can be secured to the motor mount plate 10.

The gear box mount plate 11 can be secured at right angles to the upper support 25. The upper support 25 can maintain the gear box assembly a predefined distance from the electrical equipment to be acted upon. The upper support can be the same length as the lower support, thereby maintaining the motor 12 and the gear box 13 at equal distances from the electrical equipment to be acted upon. The upper support can also be of a different length than the lower support.

The magnet mount bracket 28 can be seen in this figure as an L-shaped piece of unitary metal, such as aluminum, which secures to the motor mount plate 10 as well.

The magnet mount bracket 28 can assist in holding and supporting the magnet housing 36 at a predetermined distance away from the electrical equipment to be operated on by the tool. The magnet handle 33 which twists in this embodiment can be viewed as well.

A shaft housing 20 is viewable in this figure that is part of the rotating shaft.

This figure also shows the torque-limiting clutch 18 usable in this tool and connected to the shaft housing.

A racking socket is also shown which acts as the coupling, which is shown in FIG. 5A and FIG. 5B, for engaging the electrical equipment to be operated on by the tool portable racking tool using the rotating shaft. The axis 15 is also viewable in this figure.

The interface plug 50, which can connect the motor control housing to the remote switch operator can also be seen.

Figure 3:
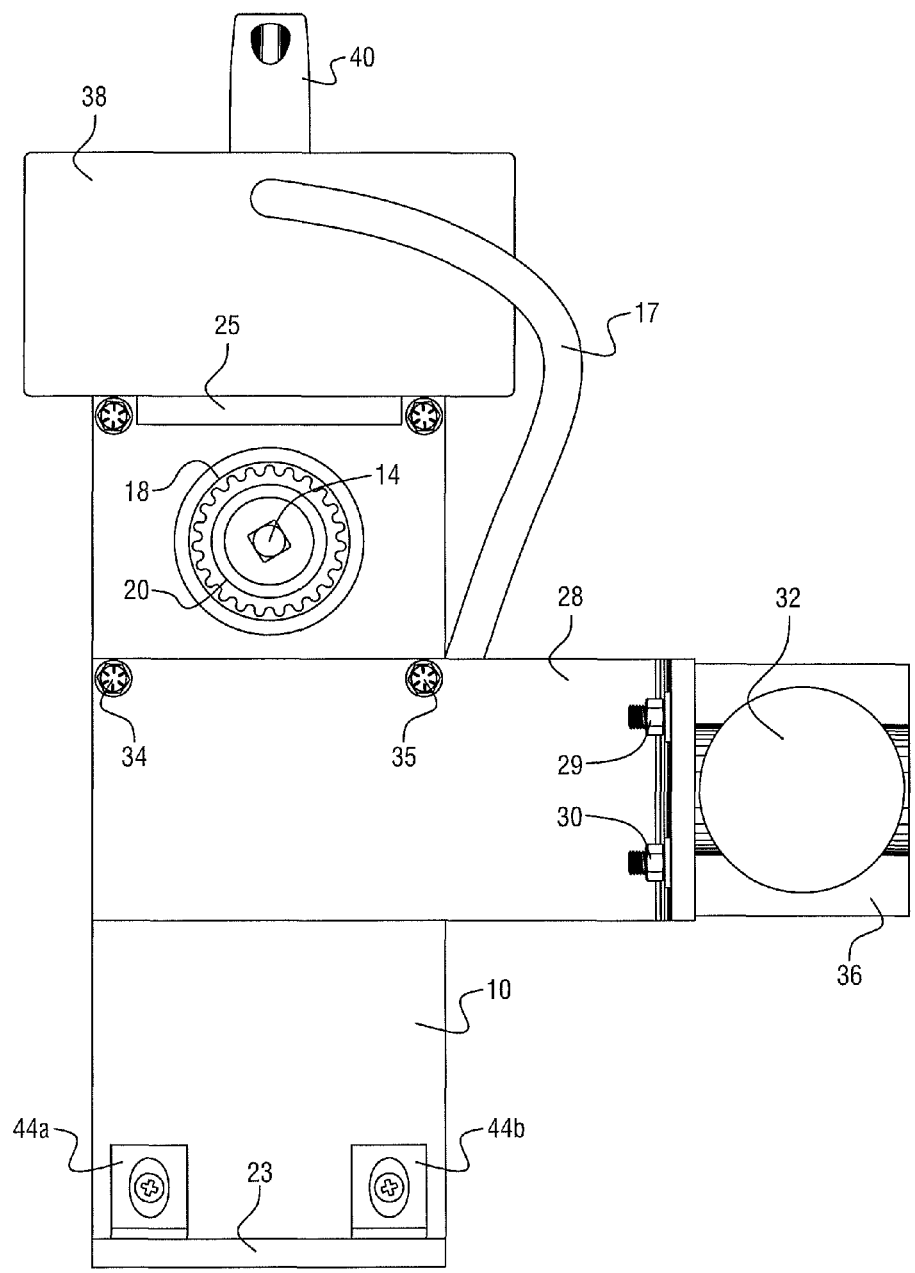
FIG. 3 is a front view of the portable racking tool.

FIG. 3 shows a front view of the portable racking tool. In this view, the handle 40 is shown secured to the motor control housing 38. The communication cable 17 is also viewable.

The motor mount plate 10 can also be seen from this angle as well as the right angles 44a and 44b, which can be used to engage the motor mount plate 10 and the lower support 23. Upper support 25 is also shown.

Magnet 32 can be seen in the magnet housing 36. The magnet housing can be fastened with bolts 29 and 30 to the magnet mount bracket 28. The magnet mount bracket 28 can be fastened to the motor mount plate 10 with two fasteners 34 and 35.

The torque-limiting clutch 18 with shaft housing 20 can be seen as well as the rotatable shaft 14 extending from the motor.

Figure 4:
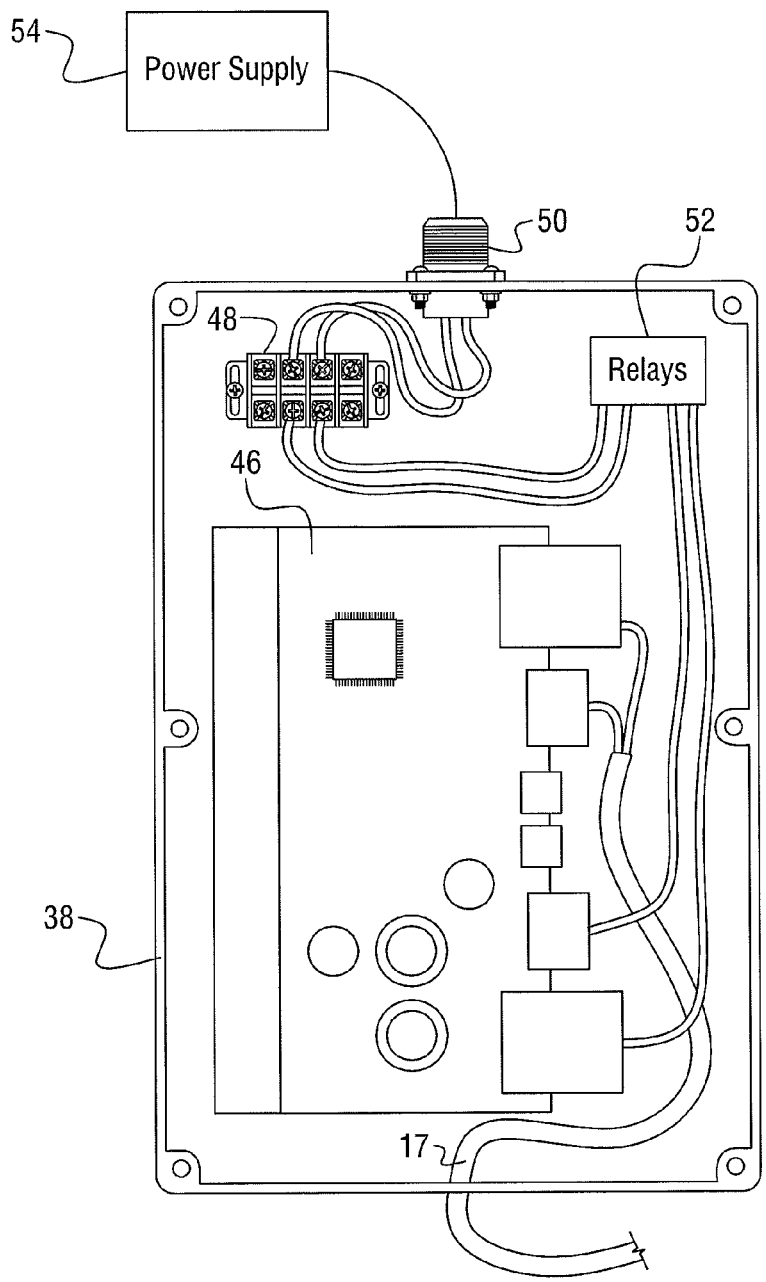
FIG. 4 is a top view of the interior of the motor control housing.

FIG. 4 is a top interior view of the motor control housing 38.

In an embodiment, the motor control housing can be made from aluminum or another lightweight metal alloy. The housing can have a back and four sides all connected together and a removable top.

The motor control housing 38 can receive power from a power supply 54 through the interface plug 50.

Current can flow through the connectors 48 to relay 52. From the relays, power can flow to the motor control circuit board 46. The communication cable 17 can run from the motor control circuit board to the motor.

FIG. 5A is a detailed view of the shaft way in the gear box 13. The gear box 13 can have a keyway 22 in the shaft housing 20 for engaging the key 24, which is shown in FIG. 5B, on the rotatable shaft 14.

FIG. 5B shows a detail of the rotatable shaft 14 with a coupling 26. The rotatable shaft can have a shaft keyway 16 containing the key 24 for engaging the keyway 22 in the shaft housing of the gear box, shown in FIG. 5A.

Figure 6:
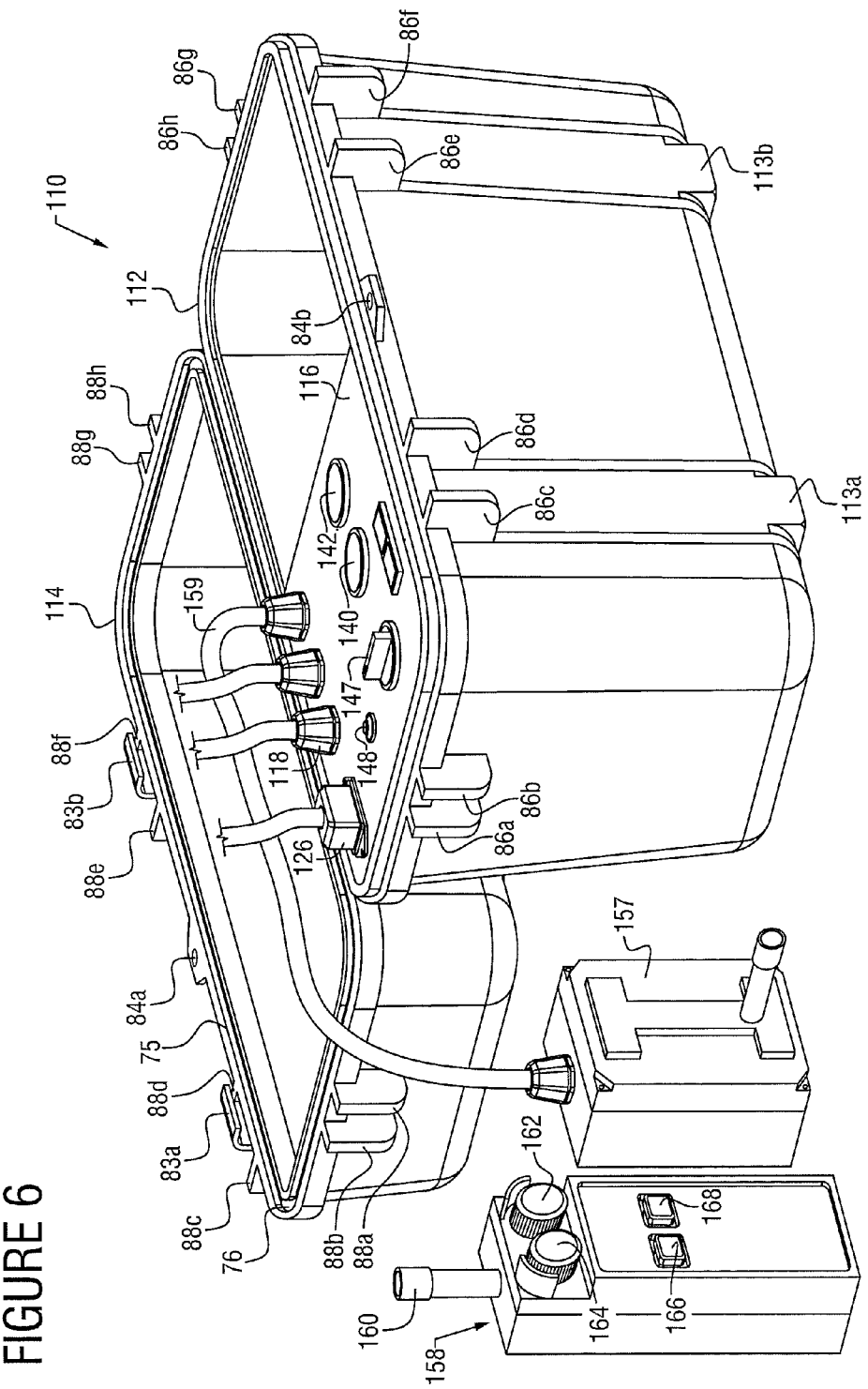
FIG. 6 is a perspective view of an embodiment of a remote switch operator usable with the portable racking tool.

FIG. 6 shows a first embodiment of a power supply apparatus that can simultaneously provide power to and control the portable racking tool.

The power supply apparatus, which is also termed herein "a remote switch operator" can connect to the interface plug 50 that engages the portable racking tool.

Figure 7:
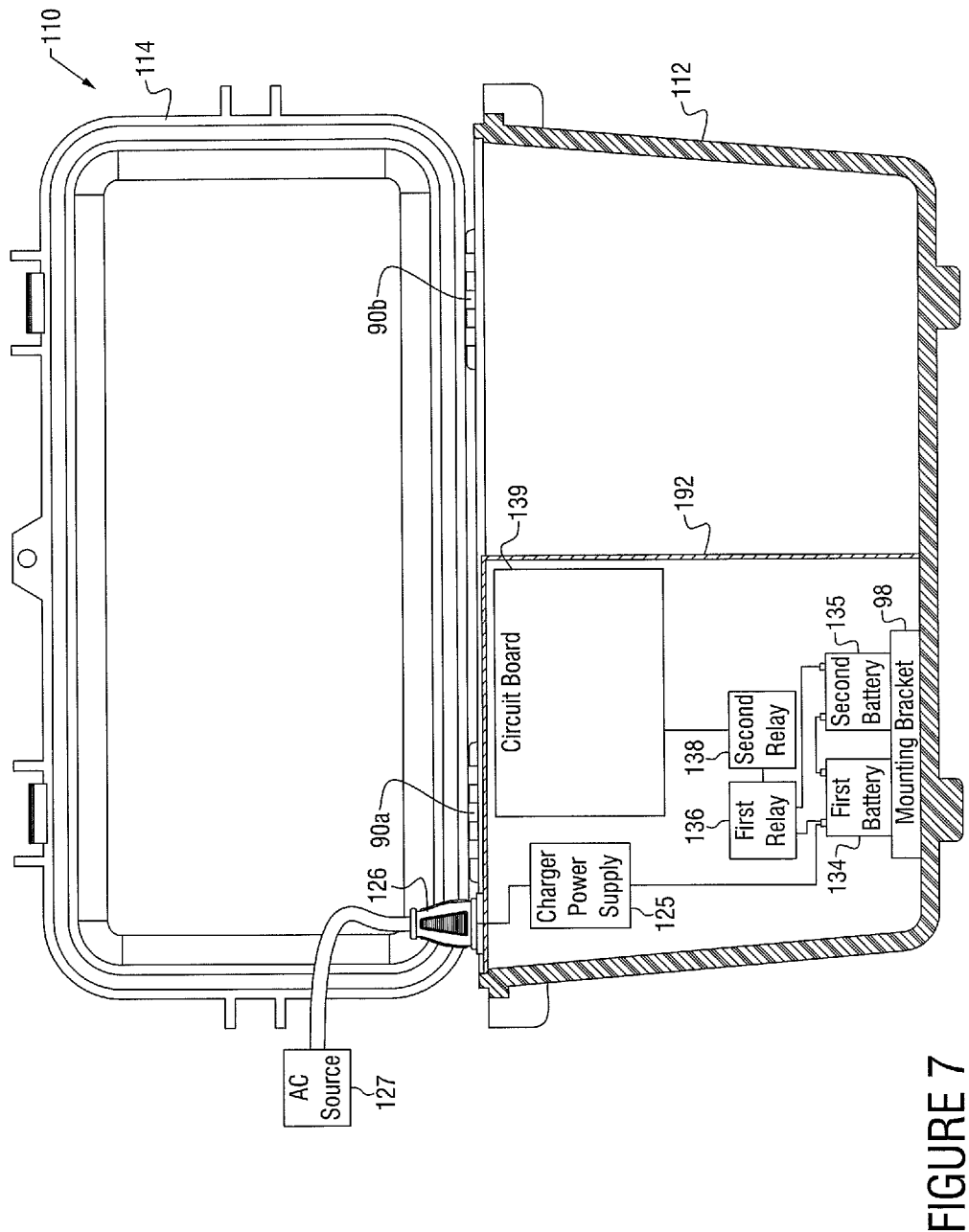
FIG. 7 is a diagram of components used in the remote switch operator of FIG. 6.

The remote switch operator can have a housing 110 with a body 112 and a lid 114 which can be connected with latches 83a and 83b and a hinges 90a and 90b, shown in FIG. 7. Connectors 84a and 84b can be used to lock the lid to the body.

The body and lid can be reinforced with ribs. The body ribs are shown as elements 86a, 86b, 86c, 86d, 86e, 86f, 86g and 86h. The lid ribs are shown as elements 88a, 88b, 88c, 88d, 88e, 88f, 88g and 88h.

Feet 113a and 113b are shown supporting the body.

A face plate 116 can be positioned in the body. In the face plate can be a power plug 118. Beneath the face plate, which is shown in FIG. 7, can be a charger power supply. Also in the face plate can be an AC plug 126, which can connect to an AC source, such as a wall socket.

Also shown located on the face plate 116 are an install momentary push button 140, remove momentary push button 142, on-off switch 147, and the circuit breaker 148.

A radio transmitter/receiver 157 is shown engaging the face plate using a cable 159.

A remote control radio unit is shown, the radio controller 158 can have an antenna 160, remote on button 162, remote off button 164, remote install button 166 and a remote remove button 168.

FIG. 6 also shows the groove 75 in the lid for containing a seal 76.

FIG. 7 shows what lies beneath the face plate in a side cut view.

The AC plug 126 can be connected to the AC source 127, which can bring power into the unit to a charger power supply 125. The charger power supply can connect to the first and second batteries 134 and 135. The batteries can be held into place with a battery mounting bracket 98.

The batteries can be connected to a first relay 136, and optionally, a second relay can be used, which is shown in this figure as second relay 138.

The relays can engage the circuit board 139.

Hinges 90a and 90b can hold the lid 114 to the body 112.

In an embodiment, the face plate can have a side 192 integrally connected to the face plate at right angles to protect the electronics in the body.

Figure 8:
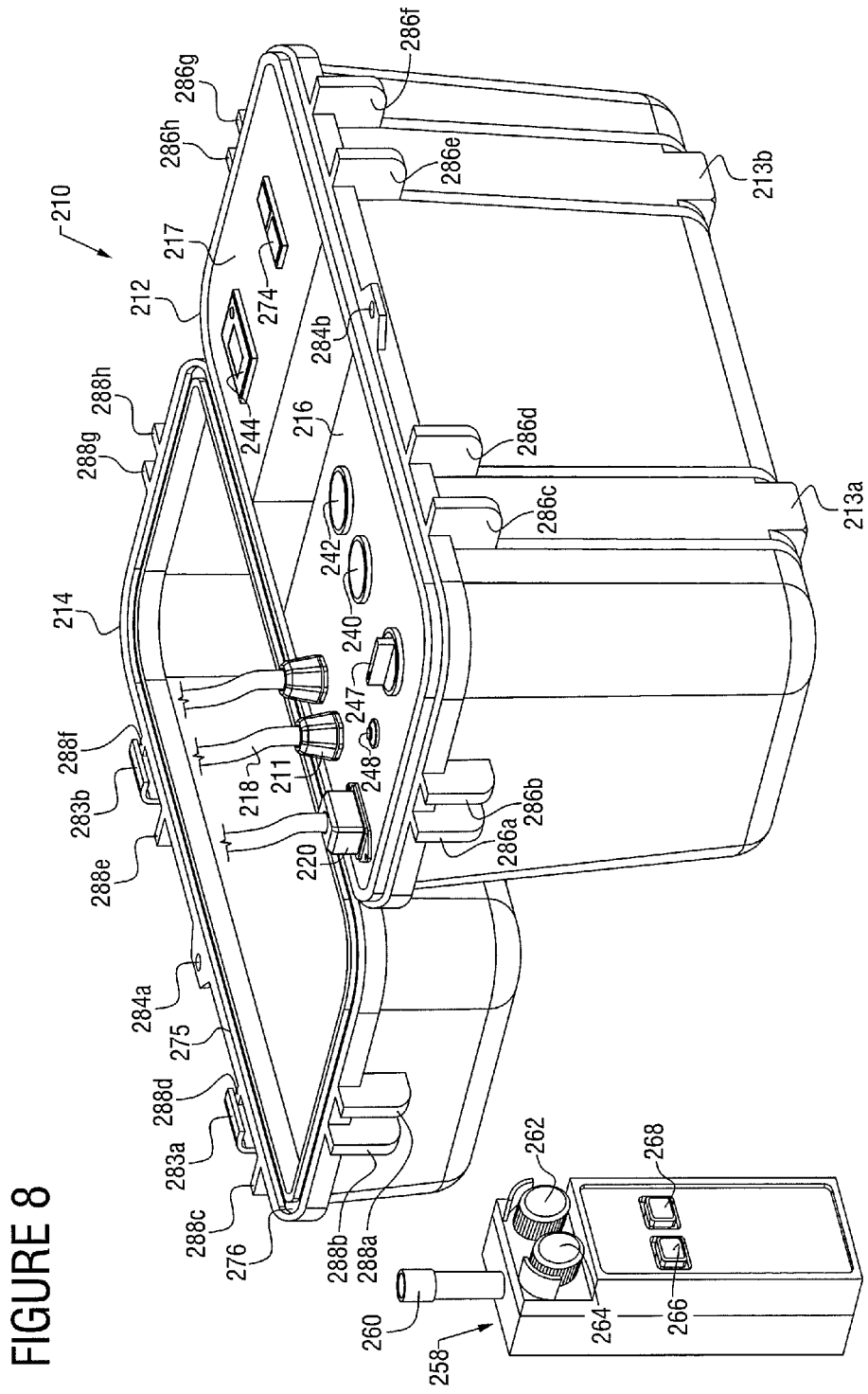
FIG. 8 is a perspective view of a second embodiment of a remote switch operator usable with the portable racking tool.

FIG. 8 shows another remote switch operator usable with the portable racking unit.

Many of the elements are the same between the two switch operators, such as the housing 210 with body 212 having a lid 214.

Body ribs 286a, 286b, 286c, 286d, 286e, 286f, 286g and 286h can provide addition support for the body 212 while lid ribs 288a, 288b, 288c, 288d, 288e, 288f, 288g and 288h can provide support to the lid 214.

Latches 283a and 283b can be used to hold the lid to the body.

Connectors 284a and 284b can enable the lid to be locked to the body.

In the lid, a groove 275 is shown for holding a sealing member 276, such as an elastomeric gasket.

Feet 213a and 213b can provide clearance from the ground if the housing is placed near water or other substance.

Radio transmitter/receiver 157, which is shown in FIG. 6, can transmit or receive signals from a radio controller 258. Radio controller 258 can have an antennae 260, remote on button 262, remote off button 264, remote install button 266 and remote remove button 268.

The first face plate 216 can have an install momentary push button 240, remove momentary push button 242, on-off switch 247, and the circuit breaker 248.

This embodiment of the remote switch operator has a current controller 244 in a second face plate 217 adjacent the first face plate 216.

The second face plate can have an automatic shut off switch 274 for shutting off the batteries.

The first face plate 216 can also have a power plug 211 that can accept a power cord 218 for transmitting power from the remote switch operator to the portable racking tool.

Figure 9:
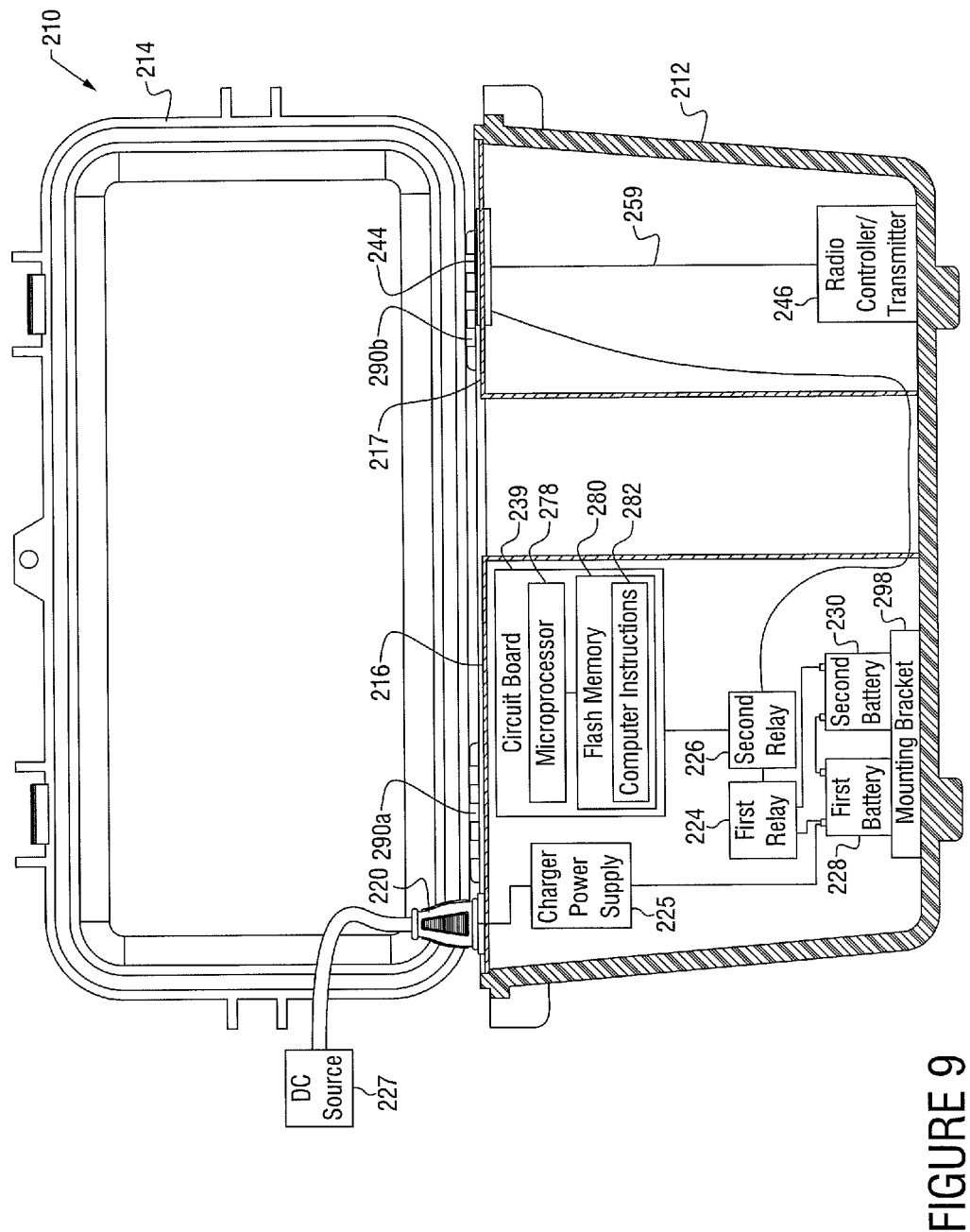
FIG. 9 is a diagram of components used in the remote switch operator of FIG. 8.

In an embodiment a DC plug 220 can be located on the first face plate 216 for accepting a DC voltage for charging at least two batteries 228, 230, shown in FIG. 9.

FIG. 9 shows beneath the first and second face plates 216 and 217.

The DC plug 220 can be connected to the DC source 227, which can bring power into the unit to a charger power supply 225. The charger power supply can connect to the first and second batteries 228 and 230. The batteries can be held into place with a battery mounting bracket 298.

The first battery 228 and second battery 230 can be connected to a first relay 224, and optionally, a second relay 226 can be used.

The first and second relays can be connected to the circuit board 239.

The circuit board 239 can have a microprocessor 278 and flash memory 280 with computer instructions 282. The batteries connect to the relay, the relay engages the circuit board, the circuit board controls the power on and off, and increase or decrease other controls of the face plates other than the current controller.

This figure shows the hinges 290a and 290b connecting the lid to the body.

The current controller 244 is shown in the second face plate 218. The current controller 244 can be connected via a cable to send electricity and signals from the current controller 244 to the relays and the batteries.

The radio controller/transmitter 246 in this embodiment can be beneath the second face plate 217. A cable 259 can send electricity and signals from the current controller 244 to the radio controller/transmitter 246.

Figure 10:
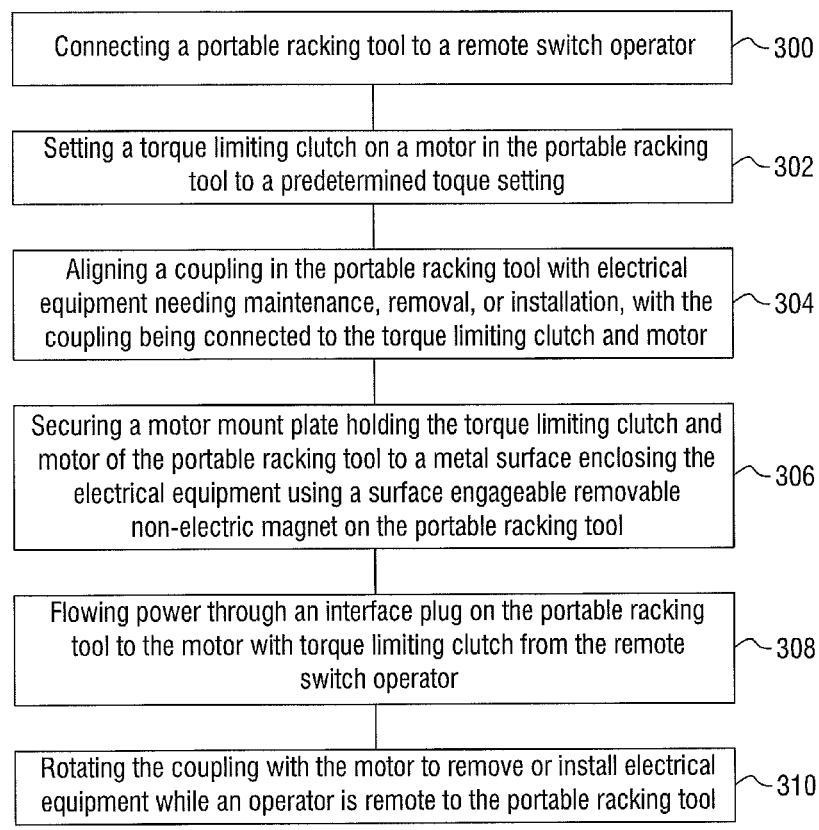
FIG. 10 is a diagram of steps used in a first embodiment of a method of the invention.

FIG. 10 is a diagram of the steps of the method useable with the invention. A first step of the method involves Step 300 connecting a portable racking tool to a remote switch operator.

In an embodiment, the portable racking tool can be a withdrawable electrical apparatus.

As step 302, the method involves setting a torque-limiting clutch on a motor in the portable racking tool to a predetermined toque setting.

Step 304 involves aligning a coupling in the portable racking tool with electrical equipment needing maintenance, removal, or installation, with the coupling being connected to the torque limiting clutch and motor.

Step 306 involves securing a motor mount plate holding the torque limiting clutch and motor of the portable racking tool to a metal surface enclosing the electrical equipment. For example, the portable racking tool can be secured to the metal surface enclosing the electrical equipment using a surface-engageable removable non-electric magnet on the portable racking tool.

Step 308 involves flowing power through an interface plug on the portable racking tool to the motor with torque-limiting clutch from the remote switch operator.

Step 310 involves rotating the coupling with the motor to remove or install electrical equipment while an operator is remote to the portable racking tool.

Figure 11:
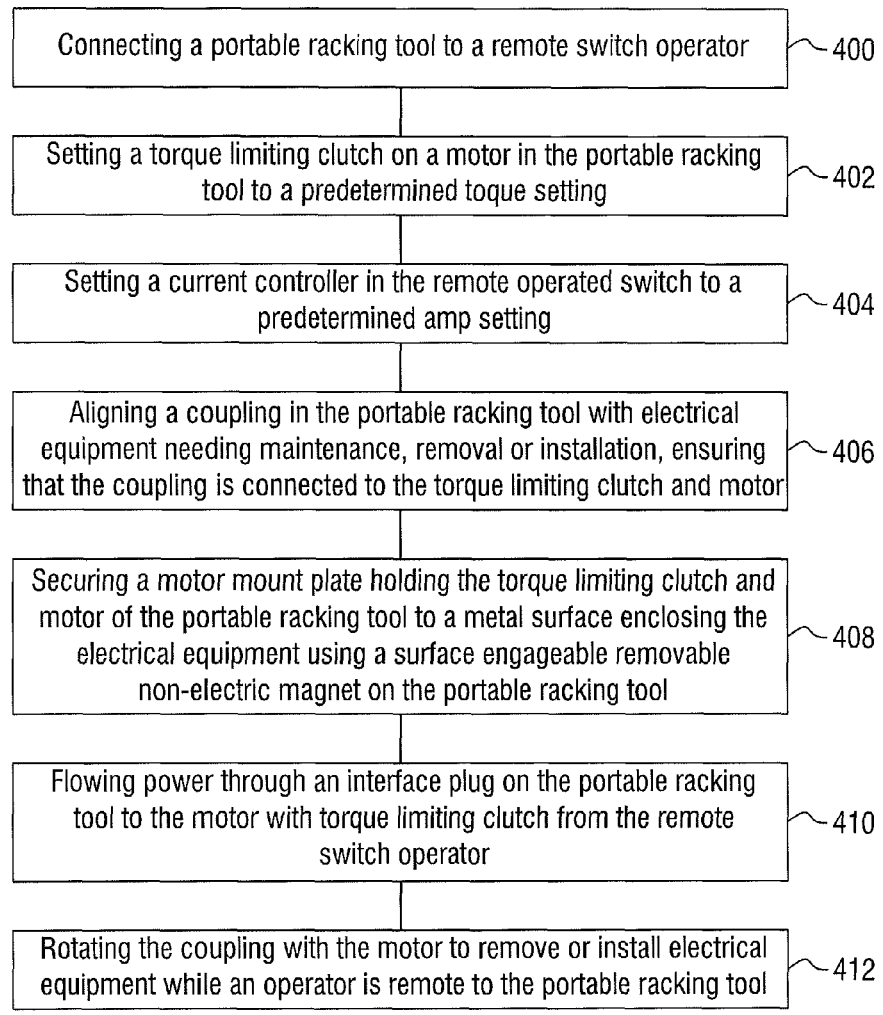
FIG. 11 is a diagram of steps used in a second embodiment of the invention. The present embodiments are detailed below with reference to the listed Figures.

In another embodiment of the method, the steps are diagrammed in FIG. 11. In the method for racking electrical equipment Step 400 involves connecting a portable racking tool to a remote switch operator.

In another embodiment of the method, the steps are diagrammed in FIG. 11. In the method for racking electrical equipment Step 400 involves connecting a portable racking tool to a remote switch operator.

Step 402 involves setting a torque-limiting clutch on a motor in the portable racking tool to a predetermined toque setting.

Step 404 requires setting a current controller in the remote switch operator to a predetermined amp setting.

Step 406 has the action of aligning a coupling in the portable racking tool with electrical equipment needing maintenance, removal or installation, ensuring that the coupling is connected to the torque limiting clutch and motor.

Step 408 involves securing a motor mount plate holding the torque limiting clutch and motor of the portable racking tool to a metal surface enclosing the electrical equipment. For example, the portable racking tool can be secured to the metal surface enclosing the electrical equipment using a surface engageable removable nonelectric magnet on the portable racking tool.

Step 410 involves flowing power through an interface plug on the portable racking tool to the motor with torque limiting clutch from the remote switch operator.

Step 412 involves rotating the coupling with the motor to remove or install electrical equipment while an operator is remote to the portable racking tool.

While these embodiments have been described with emphasis on the embodiments, it should be understood that within the scope of the appended claims, the embodiments might be practiced other than as specifically described herein.

What is claimed is:

1. A portable racking tool for removing or installing electrical equipment surrounded by a metal surface, the racking tool comprising:
 a motor mount plate for supporting a motor, the motor mount plate including an upper support and a lower support extending from the motor mount plate for aligning the racking tool against the metal surface;
 a magnet mount bracket extending from the motor mount plate and supporting a magnet movable relative to the magnet mount bracket to engage the racking tool to the metal surface;
 a handle coupled to the movable magnet, the handle movable relative to the magnet mount bracket for positioning the magnet between an extended position, to position the magnet against the metal surface surrounding the electrical equipment for engagement thereto, and a retracted position, to retract the magnet from the metal surface surrounding the electrical equipment to disengage the racking tool from the metal surface surrounding the electrical equipment;
 a rotatable output shaft operably connected to the motor and disposed between the upper and lower supports, the output shaft configured to rotate a coupling to remove or install the electrical equipment while an operator is remote to the portable racking tool; and
 a motor control housing secured to the motor mount plate, wherein the motor control housing includes a controller for controlling the motor to facilitate the removal or installation of the electrical equipment.

2. The portable racking tool of claim 1, wherein the motor is disposed on a first side of the motor mount plate and the output shaft extends through the motor mount plate to a second side of the motor mount plate.

3. The portable racking tool of claim 1, further comprising a handle for carrying the portable racking tool.

4. The portable racking tool of claim 1, wherein the magnet is a non-electric magnet.

5. The portable racking tool of claim 1, wherein the upper support member is disposed above the output shaft and the lower support member is disposed below the output shaft.

6. The portable racking tool of claim 1, further comprising a gearbox disposed on the motor mount plate.

7. The portable racking tool of claim 1, further comprising a remote operated switch for providing control to the motor.

8. The portable racking tool of claim 1, wherein the upper and lower support members extend perpendicularly from the motor mount plate.

9. The portable racking tool of claim 1, wherein the magnet is rotatably extendible to contact and secure to the metal surface.

10. The portable racking tool of claim 1, wherein the output shaft is secured to a torque limiting clutch disposed on the motor mount plate.

* * * * *